United States Patent

[11] 3,630,690

| [72] | Inventor | Patrick P. Coppola<br>Fayetteville, N.Y. |
|---|---|---|
| [21] | Appl. No. | 817,640 |
| [22] | Filed | Apr. 21, 1969 |
| [45] | Patented | Dec. 28, 1971 |
| [73] | Assignee | General Electric Company |

[54] HYDROGEN-PUMPING APPARATUS OF LAMINATED CONSTRUCTION
12 Claims, 2 Drawing Figs.

[52] U.S. Cl. ............................................. 23/288 J,
23/288 K, 23/252 R, 55/158, 55/16, 204/162,
313/174, 313/180, 252/477, 252/460, 252/181.7
[51] Int. Cl. .............................................. B01j 9/04
[50] Field of Search ........................................ 23/288,
288.8, 252, 212 A; 55/158.16; 313/174, 176, 180;
204/162; 252/477, 460, 181.7, 181.4; 230/69

[56] References Cited
UNITED STATES PATENTS

| 2,030,283 | 2/1936 | De Rewal .................... | 23/212 A |
| 3,214,245 | 10/1965 | Peters, Jr. ..................... | 23/252 |
| 3,350,846 | 11/1967 | Makrides et al. ............. | 55/16 |

*Primary Examiner*—James H. Tayman, Jr.
*Attorneys*—Marvin Snyder, W. Joseph Shanley, Frank L. Neuhauser, Oscar B. Waddell and Melvin M. Goldenberg ABSTRACT: An exhaust pump of laminar construction employs a palladium substrate and an intermediate layer of titanium between the substrate and a hydrocarbon cracker catalyst layer. The catalyst layer is exposed to a region being evacuated of gas including hydrogen, while the palladium substrate is exposed to the atmosphere. The combination of materials, operated at an elevated temperature, results in efficient hydrocarbon cracking, hydrogen pumping, and sorption of other gases.

PATENTED DEC28 1971 3,630,690

INVENTOR:
PATRICK P. COPPOLA,
BY Marvin Snyder
HIS ATTORNEY.

HYDROGEN-PUMPING APPARATUS OF LAMINATED CONSTRUCTION

INTRODUCTION

This invention relates to pumps for gaseous substances, and more particularly to a hydrogen exhaust pump of laminated construction having a palladium substrate.

Hydrogen-permeable diaphragms, such as diaphragms of palladium and alloys thereof, have been employed for transfer of hydrogen therethrough from a region of low pressure to a region of higher partial pressure of hydrogen. Diaphragms of this general type, which are maintained at an elevated temperature during pumping, are described and claimed in V. L. Stout et al., U.S. Pat. No. 3,214,359, issued Oct. 26, 1965 and assigned to the instant assignee. A pump of hollow tubular construction employing hydrogen-permeable walls and comprised of palladium with titanium annuli at either end thereof is described and claimed in P. P. Coppola application Ser. No. 799,021, filed Feb. 13, 1969, now U.S. Pat. No. 3,568,410 and assigned to the instant assignee.

In hydrogen pumps employing palladium, hydrogen is often transferred to the atmosphere from the interior or a vacuum tube device, which typically may be an electron beam device of the type employed for projection of television images and utilizing a light-modulating medium such as polybenzyl toluene, which gives off hydrogen or hydrogen-containing vapors during operation. The process by which hydrogen passes through the diaphragm is believed to involve permeation and/or diffusion, either through grain boundaries or through crystal lattice deformations, occurring upon application of heat. This hydrogen pumping is apparently made possible through a catalytic reaction of the evolved hydrogen with oxide on the external surface of the palladium diaphragm, resulting in formation of water. The water, in turn, is evaporated from the hot surface. The oxygen partial pressure of the atmosphere maintains a state of palladium oxidation to continue promoting the reaction of hydrogen with oxygen to form water, thereby sustaining hydrogen pumping.

Apparatus employing heated palladium for pumping hydrogen from a region of low hydrogen pressure to a region of higher hydrogen partial pressure has heretofore required that the heater for the palladium be situated within the region of low hydrogen pressure. This is an inconvenience in many applications, since it is desirable to make the region sealed within a chamber as low in volume as possible in order to minimize both the quantity of apparatus and the time required to reduce the pressure of gases within the chamber to a satisfactorily low level. Moreover, outgassing and sputtering of material from the heated filament tend to add contaminants to the region desired to be maintained at as low a gas pressure as possible. Additionally, presence of a heated filament within the tube tends to maintain the interior of the tube at a temperature sufficiently high to impose limitations on what materials may be employed within the tube. It is also difficult to form a compact gas-pumping structure because any organic gas-sorbing materials employed within the tube must be isolated by a heat shield or other means in order to remain cool enough to effectively perform gas sorption.

Accordingly, one object of the invention is to provide hydrogen-pumping apparatus which occupies a minimum of space within a sealed chamber being maintained at minimal gas pressure.

Another object is to provide gas-pumping apparatus which adds essentially no contaminants to the region to be maintained at low gas pressure.

Another object is to provide compact gas-pumping apparatus which imposes but minimal temperature limitations upon materials to be situated within a region of low gas pressure.

Briefly, in accordance with a preferred embodiment of the invention, apparatus for removing hydrogen from a region to be maintained at low hydrogen pressure to a region of higher hydrogen pressure comprises a laminated wall including a plurality of juxtaposed layers wherein the substrate layer comprises palladium, an intermediate second layer comprises porous gettering material, and a third layer comprises a porous hydrocarbon-cracking material. The substrate layer is situated on the higher hydrogen pressure side of the wall. Means for heating the substrate layer are situated adjacent the higher hydrogen pressure side of the wall.

BRIEF DESCRIPTION OF THE DRAWINGS

The features of the invention believed to be novel are set forth with particularity in the appended claims. The invention itself, however, both as to organization and method of operation, together with further objects and advantages thereof, may best be understood by reference to the following description taken in conjunction with the accompanying drawing in which:

DESCRIPTION OF TYPICAL EMBODIMENTS

Figure 1:
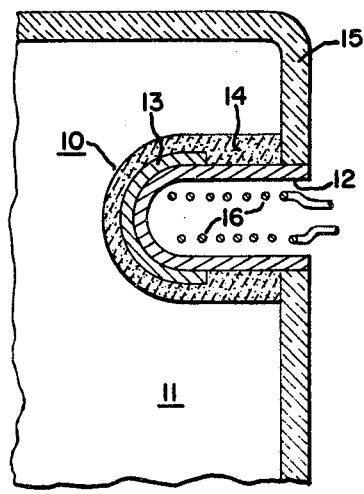
FIG. 1 is a cross-sectional view of one embodiment of the invention.

In FIG. 1, a laminated wall 10 is shown in sealed relationship to the interior 11 of a chamber from which hydrogen and other gases are to be evacuated. Wall 10 includes a substrate layer 12 which is sealed to envelope 15 defining region 11. Substrate layer 12 is comprised of palladium, conveniently in the form of a silver-palladium alloy while envelope 15 is typically comprised of glass. Layer 12 is conveniently fritted or otherwise joined to envelope 15.

Coated on palladium substrate layer 12 is a porous gettering material 13. Layer 13 is typically comprised of titanium, zirconium, or alloys thereof. Material 13 may comprise a porous matrix configuration, a porous plate, or an open sievelike structure, so as to allow adequate hydrogen conductance, or speed of hydrogen throughput to the palladium, while at the same time sorbing other gases such as oxygen, carbon monoxide, carbon dioxide, nitrogen, etc. The gettering material may be applied cataphoretically or, in the alternative, may be applied by electrostatic or nonelectrostatic spraying. As yet another alternative, the gettering material may be in the form of a porous sheet, or screen, applied by metal-cladding techniques. Gettering layer 13 may extend over the entire surface area of palladium substrate layer 12 or, as shown in FIG. 1, may extend over only a portion thereof if desired.

Coated over gettering layer 13, and any exposed portion of substrate layer 12, is a hydrocarbon-cracking catalyst layer 14. Layer 14 is typically comprised of porous metallized-ceramic materials such as palladium-alumina, palladium-silica, platinum-alumina, platinum-silica, iridium-alumina, iridium-silica, calcium silicates, thoria, etc., so as to promote cracking of hydrocarbons. Upper layer 14 is of porous configuration similar to intermediate layer 13, for the same reason; that is, layer 14 allows adequate hydrogen and other gas conductance therethrough to the underlying gettering and palladium layers. The hydrocarbon-cracking catalyst layer may also be applied cataphoretically or in the alternative, may be applied by electrostatic or nonelectrostatic spraying. Hydrocarbon-cracking catalyst layer 14 preferably extends over the entire surface of layer 13 and any exposed surface of layer 12.

Substrate layer 12 is formed in a cup- or thimble-shaped configuration to protrude into region 11, with its open end exposed to the atmosphere. Heating means 16 are situated substantially coaxially within the interior of the thimble-shaped configuration formed by wall 10 so as to heat palladium substrate 12 substantially uniformly over its entire surface in the interior of the thimble-shaped configuration. Heating means 16 may conveniently comprise a coil or helical-shaped wire of Nichrome, which is a trademark of Driver-Harris Company, Harrison, N. J., for particular compositions comprising alloys of nickel and chromium. By situating heating means 16 outside of region 11 enclosed within envelope 15, region 11 is maintained at a lower temperature, thereby imposing but minimal additional temperature requirements upon materials employed within region 11 and consequently enhancing overall operation of the light valve.

In operation, heating means 16, energized by a source of electrical power (not shown), raises the temperature of wall 10 to a level of between 500° and 1,000° C. At these temperatures, catalyst layer 14 causes cracking of hydrocarbon molecules to occur, resulting in production of hydrogen molecules and carbon molecules, as well as hydrocarbon breakdown byproduct molecules comprising aromatic hydrocarbons such as benzene, toluene, and monobenzyl toluene. The carbon molecules and aromatic hydrocarbon molecules tend to collect on the surfaces of layer 14 and the immediate vicinity of envelope wall 15, while the hydrogen molecules tend to pass through layer 14 to underlying layers 13 and 12. Some gettering of hydrogen molecules is accomplished by layer 13, although this gettering action is not very efficient because layer 13 is operated at an elevated temperature. However, molecules of other gases which may be present, such as oxygen, carbon monoxide, carbon dioxide, nitrogen, etc. are gettered efficiently by layer 13.

The hydrogen molecules which reach palladium layer 12 either through gettering layer 13 or directly through catalyst layer 14, pass through palladium wall 12 and react with palladium oxide on the external surface of wall 12 to form water. The water, in turn, is evaporated from the hot outer surface of palladium wall 12. The presence of oxygen in the atmosphere maintains an oxide of palladium on the outer surface of wall 12 which permits continuation of the hydrogen-to-water cycle and sustains hydrogen pumping. In this fashion, hydrogen molecules are removed to the atmosphere from the interior of the device to be maintained in a condition substantially depleted of hydrogen molecules.

Figure 2:
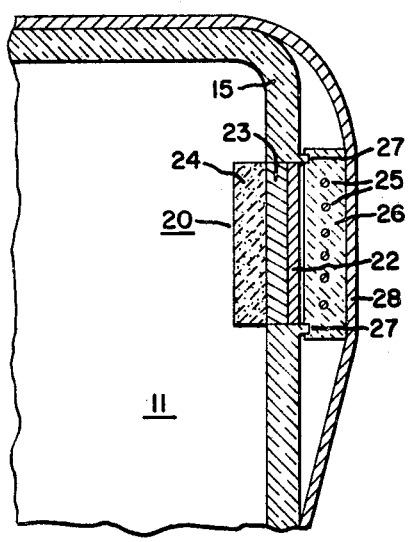
FIG. 2 is a cross-sectional view of a second embodiment of the invention.

In the embodiment of FIG. 2, a laminated wall 20 is shown in sealed relationship to the interior 11 of the chamber from which hydrogen and other gases are to be evacuated. Wall 20 in this embodiment is in the form of a flat, laminated wafer or disk, and includes a substrate layer 22 comprised of palladium, conveniently in the form of a silver-palladium alloy. Coated on palladium substrate layer 22 is a porous gettering material 23, typically comprised of titanium, zirconium, or alloys thereof, and may be in the configuration of a porous matrix, a porous plate, or an open sievelike structure so as to allow adequate hydrogen conductance while at the same time gettering gases such as oxygen, carbon monoxide, carbon dioxide, nitrogen, etc. The gettering material may be applied either cataphoretically, or by electrostatic or nonelectrostatic spraying, or by cladding techniques. Either layer 22, layer 23, or both, are conveniently fritted or otherwise joined to envelope 15, which is typically comprised of glass.

Coated over gettering layer 23 is a hydrocarbon cracker catalyst layer 24, comprised of a porous metallized-ceramic material such as palladium-alumina, palladium-silica, platinum-alumina, platinum-silica, iridium-alumina, iridium-silica, calcium silicates, thoria, etc. Layer 24 may be applied cataphoretically or, in the alternative, may be applied by electrostatic or nonelectrostatic spraying. Intermediate layer 23 need not cover the entire surface of substrate layer 22, so that upper layer 24 might, in the alternative, extend at several locations directly to the surface of layer 22.

Adhered to the atmosphere side of wall 20 is an electrical heater comprised of a heating element, such as Nichrome wire 25, embedded in a ceramic material 26 such as alumina or steatite. Ceramic material 26 is positioned closely to palladium substrate 22 of wall 20 so as to maximize heat transfer while yet allowing free movement of gases in the region between material 26 and substrate 22. Accordingly, material 26 is separated from substrate 22 by spacers 27, which may comprise lip segments of envelope 15 which are spaced at separate locations about the opening in envelope 15 in which wafer 20 is located and are mated with recesses in material 26. Material 26 is urged against spacers 27, as by a strap 28 clamped about envelope 15 so as to allow a separation of about 10 to 20 mils between material 26 and substrate 22.

Operation of the embodiment shown in FIG. 2 occurs in a manner similar to operation of the embodiment shown in FIG. 1, whenever heater 25 is energized from a source of electrical power (not shown). That is, heater 25 maintains palladium layer 22 at a temperature between 500° and 1,000° C., so that palladium layer 22 tends to pump hydrogen from region 11, which is at a low partial pressure of hydrogen, to the atmosphere, which contains a higher partial pressure of hydrogen. It should be noted that the separation of ceramic material 26 from substrate 22 is sufficiently wide to permit oxygen in the atmosphere to maintain a state of palladium oxidation on the outer surface of palladium layer 22. In addition, catalyst layer 24, at its elevated temperature level, causes cracking of hydrocarbon molecules to occur, resulting in production of hydrogen molecules and carbon molecules, as well as hydrocarbon breakdown byproduct molecules comprising aromatic hydrocarbons such as benzene, toluene, and monobenzyl toluene. The carbon molecules and aromatic hydrocarbon molecules tend to collect on the surface of layer 24 and the immediate vicinity of envelope wall 15, while the hydrogen molecules tend to pass through layer 24 to underlying layers 23 and 22. Some gettering of hydrogen molecules is accomplished by layer 23, although most of the hydrogen molecules pass through layer 23 to layer 22 and react with the oxide coating on the outer surface of the layer to form water. The high temperature maintained at the oxidized portion of palladium layer 22 causes the water thus formed to evaporate to the atmosphere through the pores of ceramic material 26. Gases such as oxygen, carbon monoxide, carbon dioxide, nitrogen, etc., are gettered by layer 23.

The foregoing describes hydrogen-pumping apparatus which occupies a minimum amount of space within a sealed chamber being maintained at minimal gas pressure. This saving of space results, in large measure, from locating the heater for the palladium outside the sealed chamber and, because there is no heated filament situated within the sealed chamber to cause outgassing and sputtering of material inside the chamber, essentially no contaminants are added to the region being maintained at low gas pressure. Accordingly, the gas-pumping apparatus of the invention is compact and, since the source of heat for the gas-pumping apparatus is shielded from the interior of the chamber by the laminated wall of the pump, the heat source for the pump imposes only minimal temperature limitations upon materials to be situated inside the chamber.

While only certain preferred features of the invention have been shown by way of illustration, many modifications and changes will occur to those skilled in the art. It is, therefore, to be understood that the appended claims are intended to cover all such modifications and changes as fall within the true spirit of the invention.

I claim:

1. Apparatus for removing hydrogen from an enclosed region to be maintained at low hydrogen pressure to a region of higher hydrogen pressure containing oxygen and situated outside said enclosed region, said apparatus comprising: a laminated wall separating said regions, said wall including a plurality of juxtaposed layers wherein a substrate layer comprises palladium, an intermediate layer comprises a porous gettering material, and an upper layer comprises a porous hydrocarbon-cracking material including a ceramic, said substrate layer being situated on the side of said wall facing said region of higher hydrogen pressure; and heating means disposed in said region of higher hydrogen pressure in proximity to said substrate layer and furnishing heat to said substrate layer.

2. The apparatus of claim 1 wherein said laminated wall is of cup-shaped configuration protruding into the region of lower hydrogen pressure, and said heating means are situated substantially coaxially with the region bounded by said wall.

3. The apparatus of claim 1 wherein said laminated wall is of disk-shaped configuration and said heating means are spaced in close proximity to said palladium layer.

4. The apparatus of claim 1 wherein said porous gettering material comprises one of the group consisting of titanium, zirconium, and alloys thereof.

5. The apparatus of claim 4 wherein said porous hydrocarbon-cracking material comprises a metallized-ceramic material of the group consisting of palladium-alumina, palladium-silica, platinum-alumina, platinum-silica, iridium-alumina, iridium-silica, calcium silicates, and thoria.

6. The apparatus of claim 2 wherein said porous gettering material comprises one of the group consisting of titanium, zirconium, and alloys thereof.

7. The apparatus of claim 6 wherein said porous hydrocarbon-cracking material comprises a metallized-ceramic material of the group consisting of palladium-alumina, palladium-silica, platinum-alumina, platinum-silica, iridium-alumina, iridium-silica, calcium silicates, and thoria.

8. The apparatus of claim 3 wherein said porous gettering material comprises one of the group consisting of titanium, zirconium, and alloys thereof.

9. The apparatus of claim 8 wherein said porous hydrocarbon-cracking material comprises a metallized-ceramic material of the group consisting of palladium-alumina, palladium-silica, platinum-alumina, platinum-silica, iridium-alumina, iridium-silica, calcium silicates, and thoria.

10. The apparatus of claim 1 wherein said substrate layer consists essentially of silver and palladium.

11. The apparatus of claim 10 wherein said laminated wall is of cup-shaped configuration protruding into the region of lower hydrogen pressure, and said heating means are situated substantially coaxially with the region bounded by said wall.

12. The apparatus of claim 10 wherein said laminated wall is of disk-shaped configuration and said heating means are spaced in close proximity to said palladium layer.

* * * * *